Patented June 5, 1945

2,377,727

UNITED STATES PATENT OFFICE 2,377,727

PURIFICATION OF TRINITRO-TERTIARY-BUTYL-META-XYLENE

Charles John Teahan, Penns Grove, N. J., assignor to E. I. du Pont de Nemours & Company, Wilmington, Del., a corporation of Delaware No Drawing. Application December 1, 1943, Serial No. 512,486

2 Claims. (Cl. 260—645)

This invention relates to the purification of trinitro-tertiary-butyl-meta-xylene, known to the trade as Xylene Musk and used extensively as a perfume fixative in toilet soaps.

This invention has an object to remove from trinitro-tertiary-butyl-xylene, as obtained by the trinitration of tertiary-butyl-meta-xylene, the impurities which are responsible for the development of a blue color in the presence of soap.

Heretofore, such impurities were removed from trinitro-tertiary-butyl-xylene by recrystallizing the latter several times from an organic solvent, such as alcohol, which is of course an expensive and time consuming procedure.

Now I have found that the said compound may be neatly rid of its impurities by the simple expedient of extracting the crude product with dilute aqueous alkali. Accordingly, my invention comprises a process whereby crude trinitro-butyl-meta-xylene, as obtained by subjecting tertiary-butyl-meta-xylene to nitration, is heated above its melting point in an aqueous solution of sodium or potassium hydroxide, and the mixture is then cooled below the crystallizing point of the organic compound. Filtration and washing free of alkali complete the process of purification and yield a product of excellent purity, which when subjected to a single recrystallization from alcohol will not develop a blue color when incorporated into soap.

The following example illustrates the invention, the parts being by weight.

One part of sodium hydroxide, 17 parts of crude trinitro-tertiary-butyl-meta-xylene (obtained by nitration of tertiary-butyl-meta-xylene), and 50 parts of water are added to an agitated vessel provided with a jacket for heating and cooling. The vessel is closed and the contents are heated to 112° C. The temperature is maintained at 112° C. for 1 hour, after which the contents of the vessel are cooled to 30° C. The resulting crystals of the purified nitro compound are filtered and washed free from alkali with water.

It will be understood that the above example is merely illustrative, and is not intended to limit this invention. Thus, the temperature for purification may vary from 110° C. to 120° C., with an internal pressure of 20 to 25 pounds absolute. My preferred temperature range is from 112° to 115° C.

It is essential that the minimum temperature be above the melting point of the crude polynitro compound.

In lieu of sodium hydroxide, other convenient alkalis may be used, for instance potassium hydroxide. The concentration of the alkali may be varied considerable, for instance from 1 to 5%.

The advantages of my invention will be readily apparent, since by the simple expedient of heating in relatively cheap dilute caustic solution several costly recrystallizations from an organic solvent are eliminated thereby saving both time and materials.

I claim:

1. The process of purifying trinitro-tertiary-butyl-meta-xylene which comprises extracting the same at a temperature above its melting point with dilute aqueous alkali and then cooling to effect crystallization of the organic compound.

2. The process of purifying trinitro-tertiary-butyl-meta-xylene which comprises heating the same at a temperature between 110° and 120° C. in a 2% solution of sodium hydroxide in water, cooling the mixture to a point where the organic compound crystallizes out, and separating the crystallized product from the alkali.

CHARLES JOHN TEAHAN.